US012369601B2

(12) United States Patent
Castro et al.

(10) Patent No.: US 12,369,601 B2
(45) Date of Patent: Jul. 29, 2025

(54) ORGANOGEL COMPOSITIONS AND THEIR USE AS A CONTROLLED DELIVERY SYSTEM IN CONFECTIONERY PRODUCTS

(71) Applicant: WM. WRIGLEY JR. COMPANY, Chicago, IL (US)

(72) Inventors: Armando J. Castro, Westchester, IL (US); Michael Saunders, Chicago, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 18/137,759

(22) Filed: Apr. 21, 2023

(65) Prior Publication Data

US 2023/0263184 A1 Aug. 24, 2023

Related U.S. Application Data

(62) Division of application No. 16/760,996, filed as application No. PCT/US2018/060068 on Nov. 9, 2018, now Pat. No. 11,666,066.

(60) Provisional application No. 62/585,149, filed on Nov. 13, 2017.

(51) Int. Cl.
| A23G 4/10 | (2006.01) |
|---|---|
| A23G 3/42 | (2006.01) |
| A23G 4/20 | (2006.01) |
| A23L 27/00 | (2016.01) |

(52) U.S. Cl.
CPC ............... *A23G 4/10* (2013.01); *A23G 3/42* (2013.01); *A23G 4/205* (2013.01); *A23L 27/72* (2016.08); *A23L 27/74* (2016.08); *A23V 2002/00* (2013.01)

(58) Field of Classification Search
CPC .. A23G 4/10; A23G 3/42; A23G 4/205; A23L 27/72; A23L 27/74; A23V 2002/00
USPC .............................................................. 426/5
See application file for complete search history.

(56) References Cited

U.S. PATENT DOCUMENTS

| 3,949,103 | A | 4/1976 | Glicksman |
|---|---|---|---|
| 4,824,681 | A | 4/1989 | Schobel et al. |
| 5,059,416 | A | 10/1991 | Cherukuri et al. |
| 2007/0160707 | A1 | 7/2007 | Garcia |
| 2012/0183663 | A1 | 7/2012 | Marangoni |
| 2015/0157038 | A1 | 6/2015 | Ergun et al. |

FOREIGN PATENT DOCUMENTS

| CN | 101448407 A | 6/2009 |
|---|---|---|
| EP | 0426428 A1 | 5/1991 |
| EP | 1113725 A1 | 7/2001 |
| WO | 9117821 A1 | 11/1991 |

(Continued)

OTHER PUBLICATIONS

Anonymous, Ethocel, Dow Cellulosics Ethocel Ethylcellulose Polymers Technical Handbook, Sep. 2005, 1-28.

(Continued)

*Primary Examiner* — Brent T O'Hern
(74) *Attorney, Agent, or Firm* — Bookoff McAndrews, PLLC

(57) ABSTRACT

The present disclosure is directed to edible organogel compositions that comprise an organogelator and a flavor component, and processes for preparing the organogel compositions. The organogel compositions may be included as the flavor component in confectionery products, such as chewing gums.

16 Claims, 7 Drawing Sheets

OIL BINDING CAPACITY
CENTRIFUGING 11.000 rpm 30 MINUTES

(56) References Cited

FOREIGN PATENT DOCUMENTS

WO         2014004018 A1     1/2014
WO     WO-2016066256 A1 *  5/2016   ............. A61K 47/14

OTHER PUBLICATIONS

Gomez-Estaca Joaquin et al., "Characterization of ethyl cellulose and beeswax oleogels and their suitability as fat replacers in healthier lipid pâtés development", Food Hydrocolloids, Sep. 22, 2018, 960-969, 87, Elsevier, Madrid, Spain.

Ogutcu Mustafa et al., Influence of Storage of Physiochemical, J Am Oil Chem Soc, Sep. 21, 2015, 1429-1443, 92, CrossMark.

* cited by examiner

ORGANOGEL COMPOSITIONS AND THEIR USE AS A CONTROLLED DELIVERY SYSTEM IN CONFECTIONERY PRODUCTS

CROSS-REFERENCE TO RELATED APPLICATIONS

This application is a divisional of U.S. application Ser. No. 16/760,996, filed on May 1, 2020, now U.S. Pat. No. 11,666,066, issued on Jun. 6, 2023, which is the U.S. national phase entry under 35 U.S.C. § 371 of International Application No. PCT/US18/60068, filed on Nov. 9, 2018, which claims the benefit of priority to U.S. Provisional Application No. 62/585,149, filed on Nov. 13, 2017, each of which is incorporated by reference herein in its entirety.

BACKGROUND OF THE DISCLOSURE

The present disclosure is directed to edible organogel compositions that comprise an organogelator and a flavor component, and processes for preparing the organogel compositions. The organogel compositions may be included as the flavor component in confectionery products, such as chewing gums.

Because the flavor portion of confectionery products, such as chewing gums, typically dissipates from the product during chewing, many confectionery products deliver an initial burst of flavor, followed by a fairly rapid decrease in flavor intensity and loss in taste, the longer the product is chewed. Various attempts have been made to improve retention of flavors, including encapsulation, either by spray drying with a variety of components, such as gum arabic or maltodextrins, or absorption onto various carriers, or by extrusion into a maltodextrin/polymer matrix. For example, U.S. Pat. No. 6,187,351 discloses encapsulating flavor in a carbohydrate-based glassy matrix prepared by the use of aqueous plasticizers and melt extrusion. U.S. Pat. No. 4,610,890 discloses a solid flavor composition made by melt blending sugar, starch hydrolysate and an emulsifier. Other patents which disclose methods of encapsulating or otherwise treating flavors include U.S. Pat. Nos. 6,235,274; 5,478,569; 5,897,897; 5,603,971; 5,506,353; 5,786,017; 5,087,461; and 4,532,145.

Some of these methods have not been completely successful in retaining flavors in confectionery products, such as chewing gum, while other such methods have been successful, but are fairly complicated and/or expensive to achieve. Hence, there is a need for a simple method of treating flavor components so that they are not rapidly lost from confectionery products, as the confectionery product undergoes its normal shelf life storage and product consumption.

BRIEF DESCRIPTION OF THE DISCLOSURE

The present disclosure is directed to edible organogel compositions that comprise an organogelator and a flavor component, and processes for preparing the organogel compositions. The organogel compositions may be included as the flavor component in confectionery products, such as chewing gums, to increase the duration and intensity of flavor in the confectionery product.

Thus, in one aspect, the present disclosure is directed to an edible organogel composition comprising ethyl cellulose, a flavor component, and an edible wax.

In another aspect, the present disclosure is directed to an edible organogel composition comprising ethyl cellulose and a flavor component, wherein the ethyl cellulose has an average ethoxyl content of from about 45.0% to about 47.0% by weight of the ethyl cellulose.

In another aspect, the present disclosure is directed to an edible organogel composition comprising a flavor component and an edible wax.

In another aspect, the present disclosure is directed to an edible organogel composition comprising from about 10% to about 15% by weight of ethyl cellulose, about 5% by weight of candelilla wax, and about 75% to about 80% by weight of a flavor component, wherein the ethyl cellulose has an average ethoxyl content of from about 45.0% to about 47.0% by weight.

In another aspect, the present disclosure is directed to a confectionery product comprising an edible organogel composition of the present disclosure.

In another aspect, the present disclosure is directed to a chewing gum comprising an edible organogel composition of the present disclosure.

In another aspect, the present disclosure is directed to a method of preparing an edible organogel composition, the method comprising: combining an ethyl cellulose, a flavor component, and an edible wax to form a mixture; heating the mixture at a temperature above the glass transition temperature of the ethyl cellulose; and cooling the mixture to a temperature below the gel point of the mixture.

In another aspect, the present disclosure is directed to a method of preparing an edible organogel composition, the method comprising: combining an ethyl cellulose and a flavor component, to form a mixture, wherein the ethyl cellulose has an average ethoxyl content of from about 45.0% to about 47.0% by weight of the ethyl cellulose; heating the mixture at a temperature above the glass transition temperature of the ethyl cellulose; and cooling the mixture to a temperature below the gel point of the mixture.

In another aspect, the present disclosure is directed to a method of preparing an edible organogel composition, the method comprising: combining a flavor component and an edible wax to form a mixture; heating the mixture at a temperature above the melting point of the edible wax; and cooling the mixture to a temperature below the gel point of the mixture.

DETAILED DESCRIPTION OF THE DISCLOSURE

Figure 1:
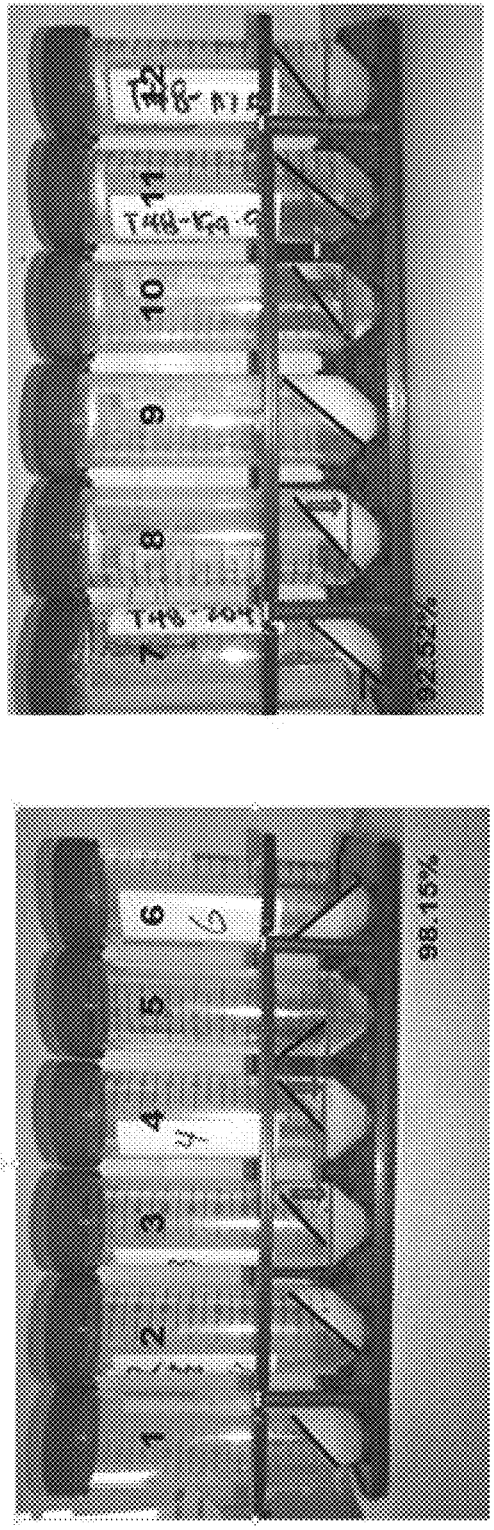
FIG. 1 is a picture depicting the oil binding capacity of various organogel compositions.

The present disclosure relates to edible organogel compositions, and methods for preparing the organogel compositions. More particularly, the disclosure relates to edible organogel compositions that comprise an organogelator, such as ethyl cellulose, an edible wax, or combinations thereof, and a flavor component. The edible organogel compositions of the present disclosure may be incorporated into confectionery products, such as chewing gums, to increase the flavor perception of the product, while maintaining overall product and flavor liking.

The organogel compositions of the present disclosure are edible, solid or semi-solid, polymer and flavor-containing gels that can be incorporated into confectionery products to increase flavor perception, i.e., flavor intensity and/or duration, of the confectionery product. The organogel compositions are prepared by combining at least one organogelator and a flavor component, heating the resulting mixture above the glass transition temperature of the organogelator until the organogelator is melted, and allowing the mixture to cool to form a solid or semi-solid gel.

The flavor portion of confectionery products, such as chewing gums, typically dissipates from the product during chewing, resulting in a decrease in flavor intensity the longer the gum is chewed. Incorporating the flavor-containing organogel compositions of the present disclosure into confectionery products addresses this problem and allows for production of a confectionery product having a longer duration of flavor intensity and release. Without wishing to be bound by any particular theory, it is believed that hydrogen bonding within the organogelator and/or between the organogelator and the flavor component forms a crystalline matrix, limiting the mobility of the flavor component. Due to the restricted mobility of the flavor component inside the polymer network, the flavor is released more slowly from the organogel, thus resulting in a longer duration of flavor intensity for the confectionery product.

Thus, in one aspect, the organogel compositions of the present disclosure, have a flavor evaporation rate of less than about 10 mg/hour, or less than about 5 mg/hour, or less than about 3 mg/hour, or less than about 2 mg/hour, and preferably have no flavor evaporation. In one particular embodiment, the organogel composition comprises from about 10% to about 15% by weight of ethyl cellulose (e.g., ethyl cellulose having an average ethoxyl content of from about 45.0% to about 47.0%), about 5% by weight of candelilla wax, and about 75% to about 80% by weight of a flavor component, and has a flavor evaporation rate of less than about 3 mg/hour. Flavor evaporation rate may be determined according to the process described in the examples.

Organogelators

The organogel compositions of the present disclosure may comprise one or more organogelator. Organogelators suitable for inclusion in the organogel compositions of the present disclosure include, but are not limited to ethyl cellulose, edible waxes, and combinations thereof. Glycerol esters of fatty acids, such as mono and di-acylglycerides, and surfactants, such as sorbitan monostearate and sorbitan monopalmitate, may also be employed as organogelators.

In one embodiment, the organogelator is ethyl cellulose. Ethyl cellulose is a cellulose ether comprising a chain of beta anhydroglucose units joined together by acetal linkages. Each anhydroglucose unit has three replaceable hydroxyl groups, all or a part of which may be substituted to form an ethoxyl group. Complete substitution of all three hydroxyl groups would give each anhydroglucose unit a substitution value of 3, or ethoxyl content of 54.88%.

As substitution increases, the hydroxyl content of the ethyl cellulose decreases. Without wishing to be bound to any particular theory, it is believed that residual hydroxyl groups in the ethyl cellulose may form hydrogen bonds with adjacent polymer chains, thus creating a stronger matrix and decreasing the melting temperature of the polymer. The higher the degree of hydrogen binding, the tighter (i.e., more closely bound) the matrix is, resulting in a gel having a higher bonding capacity, lower rate of flavor evaporation, and stronger gel. As used herein, the term "strong gel" refers to gels having high mechanical strength and elasticity, and which are capable of maintaining their shape.

Thus, in one embodiment, the polymers of ethyl cellulose that may be used in the present disclosure have an average degree of substitution of from about 2.20 to about 2.60. In one embodiment, the ethyl cellulose has an average degree of substitution of from about 2.40 to about 2.60. In another embodiment, the ethyl cellulose has an average degree of substitution of from about 2.20 to about 2.40.

The anhydroglucose units of the ethyl cellulose may be substituted with ethoxyl at the 2, 3, and/or 6 hydroxyl positions. In one embodiment, the polymers of ethyl cellulose that may be used in the present disclosure are those polymers having an average ethoxyl content of from about 45.0% to about 49.5% by weight. In one particular embodiment, the ethyl cellulose has an average ethoxyl content of from about 48.0 to about 49.5% by weight. In another embodiment, the ethyl cellulose has an average ethoxyl content of from about 45.0% to about 47.0%.

Examples of ethyl cellulose polymers suitable for use in the organogel compositions of the present disclosure include, but are not limited to, those manufactured by Dow Chemical Corporation (Midland, Mich.), and sold under the ETHOCEL trade name. ETHOCEL polymers are available in two substitution levels, Standard (e.g., ETHOCEL Standard 300) and Medium (e.g., ETHOCEL Medium 50). The Medium grade ETHOCEL ethyl celluloses will have a lower ethoxyl content, and thus will have more hydrogen bonding than the ETHOCEL Standard grade, regardless of molecular weight chosen. The properties of ETHOCEL Standard and ETHOCEL Medium are set forth below in Table 1.

TABLE 1

| Ethoxyl Type | Ethoxyl Content (%) | Moles Ethoxyl per Glucose Unit | Moles Hydroxyl per Glucose Unit | Softening Point (° C.) | Melting Point (° C.) |
| --- | --- | --- | --- | --- | --- |
| Standard | 48.0-49.5 | 2.46-2.58 | 0.42-0.54 | 133-138 | 165-173 |
| Medium | 45.0-47.0 | 2.25-2.39 | 0.61-0.75 | 145-155 | 185-195 |

Examples of suitable ETHOCEL polymers include ETHOCEL Standard 4, ETHOCEL Standard 7, ETHOCEL Standard 10, ETHOCEL Standard 14, ETHOCEL Standard 20, ETHOCEL Standard 45, ETHOCEL Medium 50, ETHOCEL Medium 70, ETHOCEL Standard 100, ETHOCEL Medium 100, ETHOCEL Standard 200, and ETHOCEL Standard 300, all commercially available from the Dow Chemical Company. Other examples of commercially available ethyl celluloses suitable for inclusion in the organogel compositions of the present disclosure include the AQUA- LON (EC) ethyl celluloses, such as AQUALON 300 ethyl cellulose (available from Ashland) offered in Ethoxyl Grades, N-grade (48.0-49.5) and T-grade (49.6-51.5).

Ethyl cellulose is offered in a wide range of viscosity type, including 3-5.5 mPa·s, 5.6-8 mPa·s, 8-11 mPa·s, 12-16 mPa·s, 18-24 mPa·s, 40-52 mPa·s, 80-105 mPa·s, 150-250 mPa·s, and 250-350 mPa·s.

In some embodiments, the organogelator is an edible wax. Examples of suitable edible waxes that may be included in the organogel compositions of the present disclosure include, but are not limited to candelilla wax, rice bran wax, carnauba wax, paraffin, beeswax, polyethylene wax, and combinations thereof. In one embodiment, the organogelator is a wax that comprises greater than 50% by weight of hydrocarbons and less than 35% by weight of esters. In one particular embodiment the edible wax is candelilla wax.

In some embodiments, the organogel composition comprises a single organogelator, such as ethyl cellulose or edible wax. In one particular embodiment, the organogelator comprises ethyl cellulose in an amount of from about 4.0% to about 25% by weight, or from about 4.7% to about 23.8% by weight, or from about 5% to about 20% by weight, or from about 5% to about 15% by weight. In one particular embodiment, the organogel composition comprises ethyl cellulose having an average ethoxyl content of from about 45.0% to about 47.0%, the ethyl cellulose being present in the organogel composition in an amount of from about 4% to about 15% by weight. In some embodiments, the organogel composition comprises ethyl cellulose as the sole organogelator and is free of edible wax (i.e., 0% edible wax).

In other embodiments, the organogel composition comprises an edible wax as the sole organogelator. In such embodiments, the organogel composition may comprise the edible wax in an amount of from about 4.5% to about 25% by weight, or from about 5% to about 25% by weight, or from about 5% to about 20% by weight, or from about 5% to about 10% by weight, or from about 10% to about 25% by weight, or from about 15% to about 20% by weight, or from about 10% to about 15% by weight, or about 4.5% by weight, or about 5% by weight, or about 10% by weight, or about 15% by weight, or about 20% by weight. In one embodiment, the edible wax is candelilla wax. In one embodiment, the organogel composition comprises an edible wax as the organogelator and is free of ethyl cellulose (i.e., 0% ethyl cellulose).

In other embodiments, the organogel composition comprises a combination of different organogelators, such as ethyl cellulose and an edible wax. In such embodiments, the organogel composition may comprise the ethyl cellulose in an amount of from about 4.0% to about 25% by weight, or from about 4.7% to about 23.8% by weight, or from about 5% to about 20% by weight, or from about 5% to about 15% by weight, and may comprise the edible wax in an amount of from about 4.5% to about 25% by weight, or from about 5% to about 25% by weight, or from about 5% to about 20% by weight, or from about 4.5% to less than 9% by weight, or from about 10% to about 25% by weight, or from about 15% to about 20% by weight, or from about 10% to about 15% by weight, or from about 4.5% to about 10% by weight, or from about 5% to about 10% by weight, or about 5% by weight, or about 10% by weight, or about 15% by weight. In one embodiment, the organogel composition comprises the edible wax in an amount of less than 9% by weight. In one particular embodiment, the edible wax is candelilla wax. In one embodiment, the ethyl cellulose has an ethoxyl content of about 45.0% to about 47.0% by weight. In one embodiment, the ethyl cellulose has an ethoxyl content of from about 48.0% to about 49.5% by weight. In one embodiment, the organogel composition comprises the ethyl cellulose and edible wax in a weight ratio of greater than 1:1 (ethyl cellulose in excess), or from about 0.84:1 to 5.3:1, or from about 1.5:1 to 3:1.

In one particular embodiment, the organogel composition comprises from about 10% to about 15% by weight of ethyl cellulose and from about 5% to about 10% by weight of edible wax (e.g., candelilla wax). In one embodiment, the organogel composition comprises from about 10% to about 15% by weight of ethyl cellulose, and about 5% by weight of candelilla wax. In one embodiment, the organogelator comprises both ethyl cellulose and an edible wax, and the organogel composition has a flavor evaporation rate that is less than 50% of the evaporation rate of a comparative composition that does not contain an edible wax. In one embodiment, the organogelator comprises both ethyl cellulose and an edible wax, and the organogel composition has a flavor evaporation rate that is less than 50% of the evaporation rate of a comparative composition that does not contain an ethyl cellulose.

Flavor Component

In addition to the organogelator, the organogel compositions of the present disclosure further comprise a flavor component. Flavor chemicals are commonly liquid organic solutions that normally contain a variety of constituents varying in chemical class, as well as physical and chemical characteristics. Although most flavors are water insoluble liquids, water soluble liquids and solids are also known. These flavors may be natural or artificial (synthetic) in origin. Often natural and artificial flavors are combined. It is also common to blend different flavors together in pleasing combinations. Although the range of flavors usable in confectionery products is nearly limitless, they commonly fall into several broad categories. Fruit flavors include lemon, orange, lime, grapefruit, tangerine, strawberry, apple, cherry, raspberry, blackberry, blueberry, banana, pineapple, cantaloupe, muskmelon, watermelon, grape, currant, mango, kiwi and many others as well as combinations thereof. Mint flavors include spearmint, peppermint, wintergreen, basil, corn mint, menthol and others and mixtures thereof. Spice flavors include cinnamon, vanilla, clove, chocolate, nutmeg, coffee, licorice, eucalyptus, ginger, cardamom and many others. Also used are herbal and savory flavors such as thyme, ginger, bourbon, umami, popcorn, chilies, cayenne pepper, and the like.

In one particular embodiment, the flavor component comprises a flavor that is an oil (i.e., a flavor oil). The flavor oil may be an essential oil, a synthetic flavor, or mixtures thereof. Examples of suitable flavor oils include, but are not limited to, oils derived from plants and fruits, such as citrus oils (e.g. orange oils), fruit essences, peppermint oil, spearmint oil, eucalyptus, other mint oils, clove oil, oil of wintergreen, cinnamic aldehyde, anise, spice flavors, terpenes, and combinations thereof.

In addition to active flavor compounds, the flavor component may also comprise a compatible solvent or carrier. This carrier, which is often a triglyceride oil, may normally represent up to 99% of the flavor component by weight, for example in an amount of from about 0.1% to about 70%, or about 1% to about 50%, or about 5% to about 30% by weight. In the present disclosure, this carrier is not a necessary part of forming the desired organogel compositions, but may optionally be present in addition to the flavor active.

Thus, in another embodiment, the flavor component comprises a flavor and a carrier. In one embodiment, the carrier comprises triacetin. In one embodiment, the carrier is an oil-based carrier. Examples of suitable oil based carriers include natural oils, triglycerides, glycerin, propylene glycol, triacetin, triethyl citrate, polyols, and combinations thereof. Suitable natural oils include oils derived from plants and animals including, but not limited to, castor oil, lanolin oil, and combinations thereof.

Triglycerides suitable for use in the flavor component include those having from about 6 to about 30 carbon atoms. Examples of suitable triglycerides include $C_8$-$C_{10}$ triglycerides, triheptanoin, triglycerides of caprylic and capric acids, such as capric triglyceride and caprylic triglyceride, and mixtures thereof. One preferred triglyceride is a caprylic/capric triglyceride, such as the NEOBEE oils, commercially available from Stepan Company (e.g., NEOBEE M5).

The flavor component is typically present in the organogel composition in an amount of from about 50% to about 90%, or about 75% to about 90%, or about 50% to about 55%, or about 55% to about 60%, or about 60% to about 65%, or about 65% to about 70%, or about 70% to about 75%, or about 75% to about 80%, or about 80% to about 85%, or about 85% to about 90% by weight of the organogel composition. In a preferred embodiment, the flavor component is typically present in an amount from about 70% to about 90%, or about 75% to about 80% by weight of the organogel composition. The range of flavor vs organogelator is dependent upon the molecular weight of the organogelator.

Optionally, the organogel compositions may further include surfactants, emulsifiers, waxes, or combinations thereof.

Since the flavor component may be a flavor oil or comprise an oil carrier, in certain embodiments, it is desirable for the organogel composition to be able to bind oil-based flavor components and to maintain gel strength in the presence of an oil-based flavor component. Thus, in one embodiment, the organogel compositions of the present disclosure have a high oil binding capacity. As used herein, "oil binding capacity" refers to the ability of the organogel compositions to retain oil following centrifugation at 11,000 rpm for 30 minutes. In certain embodiments, the organogel compositions of the present disclosure have an oil binding capacity of at least 80%, or at least 85%, or at least 90%, or at least 95%, or at least 98%, or at least 99%, or 100%.

Methods of Preparation

The organogel compositions of the present disclosure are prepared by combining the organogelator(s) and flavor component to form a mixture, heating the mixture to a temperature above the glass transition temperature of the organogelator(s), and allowing the mixture to cool to a temperature below the gel point of the mixture to form the gel. In one embodiment, the organogelators (e.g., ethyl cellulose and edible wax) are combined with the flavor component, and the resulting mixture is heated and agitated, preferably stirred, at a temperature of from about 60° C. to about 300° C., generally from about 80° to about 300° C., or from about 90° C. to about 250° C., or from about 130° C. to about 200° C., or from about 140° C. to about 170° C. In one embodiment where the organogelator comprises an edible wax but no ethyl cellulose, the mixture may be heated to a temperature of from about 60° C. to about 80° C., or from about 65° C. to about 70° C. Typical heating times (holding times) range from about 1 to about 120 minutes, or from about 5 to about 100 minutes, or from about 10 to about 80 minutes, or from about 20 to about 60 minutes, or from about 30 to about 40 minutes, until the organogelator has melted, and an organogel mixture is formed. As will be apparent to those skilled in the art, higher heating temperatures will typically require shorter holding times, whereas lower heating temperatures may require longer holding times. The specific temperature and holding time will depend on the type and properties of the organogelator (e.g., ethyl cellulose or edible wax; molecular weight of ethyl cellulose, etc.), as well as the composition of the flavor component (e.g., type and amount of carrier).

After heating and agitating the mixture at the temperatures described above, the heated mixture is preferably cooled (e.g., allowed to cool), to a temperature below the gel point of the mixture, thus forming the organogel composition. Typically, the mixture is allowed to cool to ambient temperature, for example, to a temperature of less than 30° C., or to a temperature of about 25° C. or less, or to a temperature of about 23° C. or less, or to a temperature of about 20° C. or less.

When the mixture is heated above the glass transition temperature of the organogelator, the organogelator is solubilized in the flavor component (typically comprising an oil) to create a three-dimensional, thermo-reversible gel network upon cooling. Due to the restricted mobility of the oil (present as part of the flavor component) inside the polymer network, the flavor is released more slowly from the organogel, thus allowing for a longer duration of flavor intensity for a confectionery product comprising the organogel.

Encapsulation

In some embodiments, the organogel compositions of the present disclosure may be encapsulated. The organogel compositions may be encapsulated by any means known in the art. Spray drying is the most common and economical method of encapsulating the organogel compositions, although other encapsulation techniques known in the art, such as fluid bed coating processes, may be used.

Thus, in one embodiment, the organogel composition is encapsulated by a spray drying process. The materials used for the spray drying will generally comprise a coating material, such as acacia gum (e.g., gum arabic), starches, maltodextrins, corn syrup solids, alginates, agar, gelatin, methyl cellulose, cyclodextrin, or other carriers. In one embodiment, the organogel composition may be encapsulated in a matrix of acacia gum, corn syrup solids (e.g., corn syrup solids have a DE of between about 24 and about 44), and gelatin (e.g., fish gelatin), such as described in U.S. Patent Application No. 2004/0022895, which is herein incorporated by reference. In one particular embodiment, the acacia gum is gum arabic (from Acacia Senegal).

The mixture used for spray drying will typically comprise about 0% to about 60% water, about 32% to about 10% encapsulating ingredients and about 5% to about 12% organogel composition prior to being spray dried. To prepare the organogel compositions for spray drying, the carrier or wall material (e.g., acacia gum and optionally corn syrup solids and gelatin) is hydrated to give a 40-50% solution. The corn syrup solids and gelatin, if present, are hydrated for a few minutes to give a 50% solution just before mixing with the acacia gum solution and the flavor. The organogel composition is added to the mix of acacia gum and optional other ingredients and homogenized. In one embodiment, the ratio of solids to organogel composition is about 4:1. The mixture is homogenized to create small droplets of organogel composition within the carrier solution. It is believed that the creation of a finer emulsion increases the retention of flavor during the spray drying process. The organogel/carrier mixture is fed into an atomizing spray dryer (e.g., Niro Atomizer Spray Dryer), where it is atomized through an atomizer wheel. Hot air flowing in co-current direction contacts the atomized particles and evaporates the water. This produces dried particles having the matrix containing small droplets of organogel composition. Once the dried particles have fallen to the bottom of the dryer, they are collected for further use in confectionery products. The inlet temperature for spray drying is typically from about 180° C. to about 205° C., and the outlet temperature is typically from about 80° C. to about 105° C. In one embodiment, the spray drying inlet temperature will be from about 190° C. to about 200° C., and the outlet temperature will be from about 90° C. to about 105° C. The encapsulated organogel compositions can be used as the flavor component in a wide variety of confectionery products, including chewing gums.

Thus, in one embodiment, the organogel composition of the present disclosure is a spray dried organogel composition.

Confectionery Products

The organogel compositions of the present disclosure may be incorporated into confectionery products as all or as part of the flavor portion of the confectionery product. The confectionery products may be a water-soluble solid or chewable solid such as chewing gums (e.g., tablet gums, pellet or dragee gums, stick gums, compressed gums, co-extruded layered gums, bubble gums, etc.), confections (e.g., candies, chocolates, gels, confectionery pastes, etc.), or orally soluble tablets, beads, lozenges, or capsules. In some embodiments, the confectionery product is in the form of a coating, shell, film, syrup, or suspension. In other embodiments, the organogel compositions are "admixed" with or added to the complete chewing gum or confectionery product. As used herein, "admixing," refers to the process where the organogel composition is mixed with or added to the completed product or mixed with some or all of the components of the product during product formation or some combination of these steps. When used in the context of admixing, the term "product" refers to the product or any of its components. This admixing step can include a process selected from the step of adding the organogel composition to the product, spraying the organogel composition on the product, coating the organogel composition on the product, suspending the organogel composition in the product, painting the organogel composition on the product, pasting the organogel composition on the product, mixing the organogel composition with the product and any combination thereof. Such delivery systems are well known to one of skill in the art, and preparation generally entails stirring the organogel composition into a warm base with flavor and non-cariogenic sweeteners.

In an embodiment, the organogel composition is coated on a confectionery product (e.g., forming an organogel composition layer on the confectionery product) by enrobing, spraying, dipping, brushing, tumbling or a combination thereof. In a particular embodiment, after applying the organogel composition to a confectionery product such as chewing gum, a particulate or sanded layer is formed on the confectionery product by applying a coating composition onto all or a portion of the organogel composition layer, such that the coating composition adheres to the organogel composition layer. The coating composition may include any conventional ingredient such as, but not limited to, sweeteners, flavors, sensates, functional ingredients, and food acids. In some embodiments, the coating composition may be in particulate form, crystalline form, or amorphous form. In other embodiments, the coating composition layer may be continuous or discontinuous. The coating composition layer may completely surround, coat, cover, or enclose a confectionery product. In other embodiments, the coating composition layer may only partially surround, coat, cover, or enclose a confectionery product.

In another embodiment, the coating composition comprises a particulate material. The particulate material may comprise glassy candy pieces, sprinkles, or nuts. Without be held to any particular theory, the inventors believe that the organogel composition reduces moisture migration of the particulate materials, keeping the particulate from dissolution or softening when adhered to the organogel composition layer when applied to a confectionery product. When applied as a coating, the organogel composition may or may not contain a flavor component (i.e., may comprise an organogelator only).

The materials included in the confectionery products encompassed herein are intended to be non-toxic. For the purpose of this disclosure, the term "non-toxic" is intended to conform with accepted and established definitions of safety, such as described by the designation "generally accepted as safe" by the Food and Drug Administration. Also, encompassed in this definition are those compounds that have been added to food for some time and which are recognized as safe under conditions of their intended use.

Chewing Gums

In one embodiment, the confectionery product of the present disclosure is a chewing gum. The chewing gum may include the organogel composition in any of the amounts set forth herein. In one particular embodiment, the chewing gum may comprise from about 0.1% to about 15%, by weight of organogel composition, including from about 0.1% to about 10% by weight, or about 0.1% to about 5% by weight, or about 5.0% to about 10.0% by weight, or from about 10% to about 15% by weight of organogel composition. Chewing gum products of the present disclosure may be made using a variety of different compositions that are typically used in chewing gum compositions. Suitable physical forms include sticks, tabs, dragees, chicklets, batons, and the like. Although exact ingredients for each product form will vary from product to product, the specific techniques will be known by one skilled in the art. In general, a chewing gum composition typically contains a chewable gum base portion which is essentially water-insoluble, and a water-soluble bulk portion which includes water soluble bulking agents and other water soluble components as well as flavors and perhaps other active ingredients which are typically water-insoluble. The water-soluble portion dissipates with a portion of the flavor (and other water insoluble actives, if present) over a period of time during chewing. The gum base portion is retained in the mouth throughout the chew.

The chewing gum may comprise between approximately 5% to about 95% by weight gum base. Typically, the insoluble gum base may comprise between approximately 10% and about 50% by weight of the gum, or from approximately 20% to about 40% by weight of the gum. The present disclosure contemplates employing any commercially acceptable gum base.

The insoluble gum base generally comprises elastomers, elastomer solvents, plasticizers, waxes, emulsifiers, and inorganic fillers. Plastic polymers, such as polyvinyl acetate, which behave somewhat as plasticizers, are also included. Other plastic polymers that may be used include polyvinyl laurate, polyvinyl alcohol, and polyvinyl pyrrolidone. Gum base typically comprises 20 to 40% by weight of the overall chewing gum composition. However, in less common formulations it may comprise as low as 5% or as high as 95% by weight.

Synthetic elastomers may include, but are not limited to, polyisobutylene (e.g. having a weight average molecular weight of about 10,000 to about 95,000), butyl rubber (isobutylene-isoprene copolymer), styrene copolymers (having for example a styrene-butadiene ratio of about 1:3 to about 3:1), polyisoprene, polyethylene, vinyl acetate-vinyl laurate copolymer (having for example a vinyl laurate content of about 5% to about 50% by weight of the copolymer), and combinations thereof.

Natural elastomers may include for example natural rubbers such as smoke or liquid latex and guayule, as well as natural gums such as chicle, jelutong, lechi caspi, perillo, sorva, massaranduba balata, massaranduba chocolate, nispero, rosindinha, gutta hang kang and mixtures thereof. Preferred elastomers will depend on, for example, whether the chewing gum in which the base is used is adhesive or conventional, synthetic or natural, bubble gum or regular gum. Elastomers provide the rubbery texture which is characteristic of chewing gum. Elastomers typically make up 5 to 25% by weight of the gum base.

Elastomer solvents which are sometimes referred to as elastomer plasticizers, include but are not limited to natural rosin esters such as glycerol esters, or partially hydrogenated rosin, glycerol esters of polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin, synthetics such as terpene resins, polylimonene and other polyterpenes and/or any suitable combination of the forgoing. Elastomer solvents are typically employed at levels of 5 to 30% by weight of the gum base.

Gum base plasticizers are sometimes referred to as softeners (but are not to be confused with water soluble softeners used in the water soluble portion of the gum). Typically, these include fats and oils as well as waxes. Fats and oils are typically vegetable oils which are usually partially or fully hydrogenated to increase their melting point. Vegetable oils suitable for such use include oils of cottonseed, soybean, palm (including palm kernel), coconut, shea, castor, peanut, corn, rapeseed, canola, sunflower, cocoa and others. Less commonly used are animal fats such as milk fat, tallow and lard. Structured fats, which are essentially synthetically compounded glycerol esters (triglycerides) of fatty acids of varying chain lengths, offer an ability to carefully adjust the softening profile by use of short and medium chain fatty acids which are less commonly found in nature. Commonly employed waxes include paraffin, microcrystalline and natural waxes such as beeswax and carnauba. Microcrystalline waxes, especially those with a high degree of crystallinity, may be considered bodying agents or textural modifiers. Plasticizers are typically employed at a level of 5 to 40% by weight of the gum base.

Plastic polymers, such as polyvinyl acetate, which behave somewhat as plasticizers, are also commonly used. Other plastic polymers that may be used include polyvinyl laurate, polyvinyl alcohol, and polyvinyl pyrrolidone. Most gum bases incorporate polyvinyl acetate at a level of 5 to 40% by weight of the gum base.

The gum base typically also includes a filler component. The filler component is typically an inorganic powder such as calcium carbonate, ground limestone, magnesium carbonate, talc, silicate types such as aluminum and magnesium silicate, dicalcium phosphate, tricalcium phosphate, cellulose polymers, such as wood, combinations thereof and the like. The filler may constitute from 5% to about 50% by weight of the gum base. Occasionally, a portion of the filler may be added to the chewing gum mixture separately from the gum base.

Emulsifiers, which may also have plasticizing properties, assist in homogenizing and compatibilizing the different base components. Commonly used emulsifiers include mono- and diglycerides such as glycerol monostearate, lecithin, glycerol triacetate, glycerol monostearate, acetylated monoglycerides, fatty acids and combinations thereof. Emulsifiers are commonly used at a level of 1 to 10% by weight of the gum base.

Gum bases commonly contain optional additives such as antioxidants and colors which serve their normal functions. Less commonly, flavors and sweeteners may be added to the gum base. These additives, if used, are typically employed at levels of about 1% or less by weight of the gum base.

The water-soluble portion of the chewing gum may comprise softeners, sweeteners, flavoring agents, and combinations thereof as well as other optional ingredients. For example, the majority of the water soluble portion of the chewing gum will typically comprise a water-soluble, powdered carbohydrate which serves as a bulking agent. In sugar gums, this most often is sucrose although other sugars such as fructose, erythrose, dextrose (glucose), levulose, tagatose, galactose, trehalose, corn syrup solids and the like, alone or in any combination may also be used.

Generally, sugarless chewing gums will employ sugar alcohols (also called alditols, polyols or polyhydric alcohols) as bulking agents due to their benefits of low cariogenicity, reduced caloric content and reduced glycemic values. Such sugar alcohols include sorbitol, mannitol, xylitol, hydrogenated isomaltulose, maltitol, erythritol, hydrogenated starch hydrolysate solids, and the like, alone or in any combination. Longer chain saccharides such as polydextrose and fructo-oligosaccharides are sometimes employed for their reduced caloric properties and other health benefits. The bulking agents typically comprise approximately 5% to about 95% by weight of the gum composition.

Softeners are added to the chewing gum in order to optimize the chewability and mouth feel of the gum. Softeners, also known in the art as plasticizers or plasticizing agents, generally constitute between approximately 0.5% to about 15% by weight of the chewing gum. These include glycerin, propylene glycol and aqueous sweetener solutions (syrups). Examples of syrups include corn syrups and (generically) glucose syrups which are usually prepared from hydrolyzed starch. For sugarless products, the starch hydrolysate may be hydrogenated to produce an ingredient known as hydrogenated starch hydrolysate syrups or maltitol syrups. These HSH syrups have largely replaced sorbitol solutions previously used in sugarless gums because they also function as binders to improve the flexibility and other physical properties of the gum. Softeners are also often used to control the humectancy (water absorbing properties) of the product.

An emulsifier is sometimes added to the gum to improve the consistency and stability of the gum product. They may also contribute to product softness. Lecithin is the most commonly employed emulsifier, although nonionic emulsifiers such as polyoxyethylene sorbitan fatty acid esters and partial esters of common fatty acids (lauric, palmitic, stearic and oleic acid hexitol anhydrides (hexitans and hexides) derived from sorbitol may also be used. When used, emulsifiers typically comprised 0.5 to 2% by weight of the chewing gum composition.

Suitable surface active agents include surface active agents, which can be salts of potassium, ammonium, or sodium. Sodium salts include anionic surface active agents, such as alkyl sulfates, including sodium lauryl sulfate, sodium laureth sulfate, and the like. Other sodium salts include sodium lauroyl sarcosinate, sodium brasslate, and the like. Suitable ammonium salts include betaine derivatives such as cocamidopropyl betaine, and the like.

In the case of sugarless gums, it is usually desirable to add high intensity sweeteners to compensate for the reduced sweetness resulting from substitution of sugar alcohols for the sucrose in sugar gums. More recently, the trend has been to also add high intensity sweeteners to sugar gums to boost and extend flavor and sweetness. High intensity sweeteners (which are sometimes called high potency or artificial sweeteners) may be defined as food acceptable chemicals which are at least twenty times sweeter than sucrose. Commonly used high intensity sweeteners include aspartame, sucralose, and acesulfame-K. Less common are saccharin, thaumatin, alitame, neotame, cyclamate, perilla derived sweeteners, stevia derived sweeteners, monatin, monellin and chalcones.

Usage levels for high intensity sweeteners may vary widely depending on the potency of the sweetener, local market preferences and the nature and level of other ingredients which might impart bitterness to the gum. Typical levels can range from about 0.01% to about 2% by weight, although some applications may dictate usage outside that range. These sweeteners may be combined together, or with non-high intensity sweeteners at varying levels to impart a sweetness synergy to the overall composition.

Flavors, in addition to those included in the organogel compositions, can also optionally be employed to impart a characteristic aroma and taste sensation to chewing gum products. As discussed herein, most flavors are water insoluble liquids but water soluble liquids and solids are also known. These flavors may be natural or artificial (synthetic) in origin. Often natural and artificial flavors are combined. It is also common to blend different flavors together in pleasing combinations. Although the range of flavors usable in chewing gums is nearly limitless, they commonly fall into several broad categories. Fruit flavors include lemon, orange, lime, grapefruit, tangerine, strawberry, apple, cherry, raspberry, blackberry, blueberry, banana, pineapple, cantaloupe, muskmelon, watermelon, grape, currant, mango, kiwi and many others as well as combinations. Mint flavors include spearmint, peppermint, wintergreen, basil, corn mint, menthol and others and mixtures thereof. Spice flavors include cinnamon, vanilla, clove, chocolate, nutmeg, coffee, licorice, eucalyptus, ginger, cardamom and many others. Also used are herbal and savory flavors such as popcorn, chili, corn chip and the like. Flavors are typically employed at levels of 0.1 to 4% by weight of the finished gum product. In recent years there has been a trend toward increasing flavor levels to provide higher flavor impact.

It is common to co-dry and encapsulate flavors with various carriers and/or diluents. For example, spray-dried flavors using gum arabic, starch, cyclodextrin or other carriers are often used in chewing gum for protection, controlled release, control of product texture and easier handling as well as other reasons. When flavors are in such forms, it will often be necessary to increase the usage level to compensate for the presence of the carriers or diluents.

The chewing gum (along with any of the confectionery products) of the present disclosure may employ various sensates. Generally, sensates may be any compounds that cause a cooling, heating, warming, tingling or numbing, for example, to the mouth or skin. Cooling agents are trigeminal stimulants that impart a cool sensation to the mouth, throat and nasal passages. The most widely known cooling agent is menthol, although this is often considered a flavor due to its aroma properties and the fact that it is a natural component of peppermint oil. More often, the term cooling agent refers to other natural or synthetic chemicals used to impart a cooling sensation with minimal aroma. Commonly employed cooling agents include ethyl p-menthane carboxamide and other N-substituted p-menthane carboxamides, N,2,3-trimethyl-2-isopropyl-butanamide and other acyclic carboxamides, menthyl glutarate (Flavor Extract Manufacturing Association (FEMA 4006)), 3-1-menthoxypropane-1, 2-diol, isopulegol, menthyl succinate, menthol propylene glycol carbonate, menthol ethylene glycol carbonate, menthyl lactate, menthyl glutarate, menthone glyceryl ketal, p-menthane-1,8-diol, menthol glyceryl ether, N-tertbutyl-p-menthane-3-carboxamide, p-menthane-3-carboxylic acid glycerol ester, methyl-2-isopryl-bicyclo (2.2.1), heptane-2-carboxamide, menthol methyl ether and others and combinations thereof.

Cooling agents may be employed to enhance the cool taste of mint flavors or to add coolness to fruit and spice flavors. Cooling agents also provide the perception of breath freshening, which is the basis of the marketing of many chewing gums and confections.

Trigeminal stimulants other than cooling agents may be employed in the chewing gums of the present disclosure. These include warming agents such as capsaicin, capsicum oleoresin, red pepper oleoresin, black pepper oleoresin, piperine, ginger oleoresin, gingerol, shoagol, cinnamon oleoresin, cassia oleoresin, cinnamic aldehyde, eugenol, cyclic acetal of vanillin, menthol glycerin ether and unsaturated amides and tingling agents such as Jambu extract, vanillyl alkyl ethers such as vanillyl n-butyl ether, spilanthol, Echinacea extract and Northern Prickly Ash extract. Some of these components are also used as flavoring agents.

Chewing gum generally conveys oral care benefits. In addition to mechanical cleaning of the teeth provided by the chewing action, saliva stimulated by chewing, flavor and taste from the product conveys additional beneficial properties in reducing bad breath, neutralizing acid, and the like. Saliva also contains beneficial polypeptides and other components which may improve the oral environment. These include: antimicrobial proteins, such as lysozyme, lactoferrin, peroxidases, and histatins; inhibitors of spontaneous crystallization, such as statherin.

The chewing gums of the present disclosure can provide these benefits along with the benefits disclosed herein, and may also be used as vehicles for the delivery of specialized oral care agents. These may include antimicrobial compounds such as Cetylpyridinium Chloride (CPC), triclosan and chlorhexidine; anti-caries agents such as calcium and phosphate ions, plaque removal agents such as abrasives, surfactants and compound/ingredients; plaque neutralization agents such as ammonium salts, urea and other amines; anti-tartar/calculus agents such as soluble pyrophosphates salts; anti halitosis agents such as parsley oil and copper or zinc salts of gluconic acid, lactic acid, acetic acid or citric acid, and whitening agents such as peroxides; agents that may provide either local or systemic anti-inflammatory effects to limit gingivitis, such as COX-2 inhibitors; agents that may reduce dentinal hypersensitivity, such as potassium salts to inhibit nerve cell transmission, and calcium phosphate salts to block the dentinal tubules.

Certain flavors such as peppermint, methyl salicylate, thymol, eucalyptol, cinnamic aldehyde and clove oil (eugenol) may have antimicrobial properties which benefit the oral cavity. These flavors may be present primarily for flavoring purposes or may be added specifically for their antimicrobial properties.

Certain mineral agents may contribute to dental health, in addition to ones disclosed by the disclosure by combating demineralization and enhancing remineralization of teeth. Such ingredients include fluoride salts, dental abrasives and combinations thereof.

Teeth color modifying substances may be considered among the oral care actives useful. These substances are suitable for modifying the color of the teeth to satisfy the consumer such as those listed in the CTFA Cosmetic Ingredient Handbook, 3rd Edition, Cosmetic and Fragrances Associations Inc., Wash. D.C. (1982), incorporated herein by reference. Specific examples include talc, mica, magnesium carbonate, magnesium silicate, aluminum magnesium carbonate, silica, titanium dioxide, zinc oxide, red iron oxide, brown iron oxide, yellow iron oxide, black iron oxide, ferric ammonium ferrocyanide, manganese violet, ultramarine, nylon powder, polyethylene powder and mixtures thereof.

The chewing gums of the present disclosure may be used to deliver biologically active agents to the chewer. Biologically active agents include vitamins, minerals, anti-oxidants, nutritional supplements, dietary supplements, functional food ingredients (e.g., probiotics, prebiotics, lycopene, phytosterols, stanol/sterol esters, omega-3 fatty acids, adenosine, lutein, zeaxanthin, grape seed extract, *Ginkgo biloba*, isothiocyanates and the like), OTC and prescription pharmaceuticals, vaccines, and nutritional supplements.

It may be desirable to take certain steps to increase or decrease the rate of the release of the agent or to ensure that at least a minimum quantity is released. Such measures as encapsulation, isolation of the active, measures to increase or decrease interaction with the water-insoluble portion of the gum and enteric coating of actives may be employed to that end.

In general, chewing gum is manufactured by sequentially adding the various chewing gum ingredients to a commercially available mixer known in the art. After the ingredients have been thoroughly mixed, the gum mass is discharged from the mixer and shaped into the desired form such as rolling sheets and cutting into sticks, extruding into chunks or casting into pellets, which are then coated or panned.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further parts of the bulking agent are added to the mixer. The organogel compositions and any additional flavoring agents are typically added with the final portion of the bulking agent. Other optional ingredients are added to the batch in a typical fashion, well known to those of ordinary skill in the art.

The entire mixing procedure typically takes from five to fifteen minutes, but longer mixing times may sometimes be required. Those skilled in the art will recognize that many variations of the above described procedure may be followed.

In some embodiments, the organogel composition is incorporated into the center portion of the gum. For instance, in certain embodiments, the organogel composition is incorporated into a center layer of the gum, or is center filled, using any suitable technique known in the art. Thus, in one particular embodiment, the chewing gum comprises a center filling, and the organogel composition is present in the center filling. In other embodiments, the organogel composition may be incorporated into a coating syrup or coating flavor, such as described hereinafter.

Chewing gum base and chewing gum product have been manufactured conventionally using separate mixers, different mixing technologies and, often, at different factories. One reason for this is that the optimum conditions for manufacturing gum base, and for manufacturing chewing gum from gum base and other ingredients such as sweeteners and flavors, are so different that it has been impractical to integrate both tasks. Chewing gum base manufacturing involves the dispersive (often high shear) mixing of difficult-to-blend ingredients, such as elastomer, filler, elastomer plasticizer, base softeners/emulsifiers, and sometimes waxes. This process typically requires long mixing times. Chewing gum product manufacture also involves combining the gum base with more delicate ingredients such as product softeners, bulk sweeteners, high intensity sweeteners and flavoring agents using distributive (generally lower shear) mixing, for shorter periods.

Chewing gums of the present invention may also be coated. Pellet or ball gum is prepared as conventional chewing gum, but formed into pellets that are pillow shaped, or into balls. The pellets/balls can be then sugar coated or panned by conventional panning techniques to make a unique sugar coated pellet gum.

Conventional panning procedures generally coat with sucrose, but recent advances in panning have allowed the use of other carbohydrate materials to be used in the place of sucrose. Some of these components include, but are not limited to, dextrose, maltose, palatinose, xylitol, lactitol, hydrogenated isomaltulose and other new alditols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum, and gum tragacanth, insoluble carbonates like calcium carbonate or magnesium carbonate and talc. Antitack agents may also be added as panning modifiers which allow the use of a variety of carbohydrates and sugar alcohols to be used in the development of new panned or coated gum products. Essential oils may also be added with the sugar coating to yield unique product characteristics.

The organogel compositions of the present disclosure can be easily added to a hot sugar solution prepared for sugar panning. In another embodiment, the organogel composition can also be used as a powder alone or blended with a powdered hydrocarbon and used in conventional panning procedures.

Candies/Other Confectioneries

As previously discussed, the present disclosure is also directed to confectionery products, such as hard candies, chewy candies, coated chewy center candies, tableted candies, chocolates, nougats, dragees, confectionery pastes and the like. These candies or confectionery products may comprise any of the various sugars and sweeteners, flavoring agents and/or colorants, as well as other components, known in the art and/or set forth above in the discussion of chewing gums. Additionally, these candies or confectionery products may be prepared using processing conditions and techniques known in the art. The candies or confectionery products may include the organogel composition in any of the amounts set forth herein. In one particular embodiment, the candies or confectionery products may comprise up to about 5.0% by weight of organogel composition, including from about 0.1% to about 5.0% by weight of organogel composition.

By way of example, a hard candy can be primarily comprised of corn syrup and sugar, and derives its name from the fact that it contains only between 1.0% and 4% by weight moisture. In appearance, these types of candies are solid, but they are actually super-cooled liquids, which are far below their melting points. There are different types of hard candies. Glass types are usually clear or made opaque with dyes; and grained types, which are always opaque, due to entrapped air and/or moisture.

For illustrative purposes, it is to be noted that a continuous making process for making deposited glass types, with a sugar base can be generally as follows. Sugar corn syrup mixture is spread over a cylinder heated by high pressure steam. Rapid head exchange causes the water in the syrup to evaporate. The cooked syrup is discharged, colors and the organogel composition and optionally other flavors are added. These can be conveyed directly to hoppers which then discharge directly into molds. The candy is conveyed to batch rollers, which shapes and sizes the batch. The candy enters a former, which shapes the individual pieces into discs, balls, barrels, etc. The present disclosure can be made into any shape, circles, squares, triangles etc., also into animal shapes or any other novelty molding available. The candy is then cooled, wrapped and packaged.

For grained types of candy, water and sugar are the basic components being mixed with other ingredients, and cooked at high temperatures (290° F. to 310° F.), causing the water to turn to steam. The product is transferred to a cooling wheel, where it is collected in about 150 pound batches, placed in a pulling machine to aerate the product, and the organogel composition and optionally additional flavor is added. The candy is transferred to batch rollers where it is shaped and sized. The candy then enters a former, which shapes the individual pieces. The candy is cooled at a relative humidity of 35% and enters a rotating drum where it is coated with a fine sugar. The candy is then conveyed to the graining room for four hours at 90° F. and 60% humidity. The entrapped air and moisture causes the product to grain. The magnolia extract and hydrocarbon may be added at any suitable point during the manufacturing process, and typically during addition of the flavors.

Alternate Products

In some embodiments, the organogel composition may be included as a flavor component in other oral compositions including, for example, a lozenge, bead, tablet, or capsule. The lozenge, bead, tablet, or capsule may include the organogel composition in any of the amounts set forth herein. In one particular embodiment, the lozenge, bead, tablet, or capsule may comprise up to about 50.0% by weight of organogel composition, or from about 0.1% to about 50% by weight. The orally acceptable vehicle or carrier used to form a lozenge, bead, tablet, or capsule is typically a non-cariogenic, solid water-soluble polyhydric alcohol (polyol) such as mannitol, xylitol, sorbitol, maltitol, erythritol, hydrogenated starch hydrozylate (HSH), hydrogenated glucose, hydrogenated disaccharides or hydrogenated polysaccharides, in an amount of about 85 to about 95% by weight of the total composition. Emulsifiers such as glycerin, and tableting lubricants, in minor amounts of about 0.1 to 5% by weight, may be incorporated into the tablet, bead, lozenge, or capsule formulation to facilitate the preparation of the tablet, beads, capsules, and lozenges. Suitable lubricants include vegetable oils such as coconut oil, magnesium stearate, aluminum stearate, talc, starch and polyethylene glycols. Suitable noncariogenic gums include kappa carrageenan, carboxymethyl cellulose, hydroxyethyl cellulose and the like.

A lozenge, bead, tablet, or capsule may optionally be coated with a coating material such as waxes, shellac, carboxymethyl cellulose, polyethylene/maleic anhydride copolymer or kappa-carrageenan to further increase the time it takes the tablet or lozenge to dissolve in the mouth. The uncoated tablet or lozenge is slow dissolving, providing a sustained release rate of active ingredients of about 3 to 5 minutes. Accordingly, the solid dose tablet, bead and lozenge compositions of this embodiment affords a relatively longer time period of contact of the teeth in the oral cavity with the magnolia extract of the present invention.

In some embodiments, the oral composition is a lozenge or capsule. The lozenge or capsule may comprise a core comprising the organogel composition, and/or a coating, such as described herein, optionally comprising additional organogel composition. In one embodiment, the oral composition is a capsule comprising an oil-based core comprising the organogel composition. In general, the capsules contain a hydrocolloid. The hydrocolloid is a selected from a natural gum, a biosynthetic gum, a natural seaweed, a natural plant extrudate, a natural fiber extract, a gelatin, a biosynthetic process starch, a cellulosic material, an alginate, pectin, and combinations thereof.

EXAMPLES

The disclosure may be further illustrated with reference to the following non-limiting examples.

Example 1: Organogel Formation

Organogel compositions were prepared from ethyl cellulose and a variety of flavor components.

The organogel compositions were formed using either 10% by weight ETHOCEL Standard 100 ethyl cellulose, (with an ethoxyl content of 48.0-49.5% and molecular weight of 100, available from Dow Chemical) or, 10% or 15% by weight of AQUALON 300 ethyl cellulose (with an ethoxyl content of 48.0-49.5% and a molecular weight of 300, available from Ashland), and a flavor. The ethyl cellulose and flavor were mixed and heated to 80-150° C. to melt the ethyl cellulose. The mixture was allowed to cool to form the gels. The organogels were measured for gel strength twenty four hours after formation, and rated on a scale of 1-10. Gel strength was determined by measuring the time it took for the organogel to change from vertical to horizontal after turning a glass vial containing the organogel 90 degrees. A rating of 0 indicated the mixture was a viscous liquid, and no gel was formed, and a rating of 10 indicated a stronger gel was formed (i.e., the gel did not change position in the vial). The results are set forth in Table 2.

Duplicate flavors designated by an "A" or "B" below reflect different concentrations of the flavor ingredients in an oil acting as diluent.

TABLE 2

| Flavor | ETHOCEL 100 (15% by weight) + flavor (85% by weight) | AQUALON 300 (10% by weight) + flavor (90% by weight) | AQUALON 300 (15% by weight) + flavor (85% by weight) |
| --- | --- | --- | --- |
| Apple | 1 | 1 | 3 |
| Cherry | 2 | 3 | 4 |

TABLE 2-continued

| Flavor | ETHOCEL 100 (15% by weight) + flavor (85% by weight) | AQUALON 300 (10% by weight) + flavor (90% by weight) | AQUALON 300 (15% by weight) + flavor (85% by weight) |
|---|---|---|---|
| Watermelon A | 5 | 4 | 8 |
| Watermelon B | 3 | 7 | 4 |
| Cinnamon | 2 | 1 | 8 |
| Banana | 1 | 2 | 7 |
| WS-23 | 9 | 9 | 9 |
| Peach | 8 | 7 | 9 |
| Mango | 9 | 9 | 9 |
| Blueberry | 9 | 9 | 9 |
| Strawberry A | 6 | 2 | 8 |
| Raspberry | 7 | 6 | 9 |
| Strawberry B | 8 | 3 | 8 |
| Lemon | 3 | 5 | 8 |
| Jasmin tea | 9 | 9 | 9 |
| Winterfresh | 3 | 4 | 8 |
| Eucalyptol | 4 | 3 | 8 |
| Spearmint | 2 | 3 | 7 |
| Eucalyptus citrus | 7 | 7 | 9 |
| Peppermint A | 8 | 3 | 7 |
| Peppermint B | 7 | 4 | 8 |
| Benzaldehyde | 1 | 1 | 2 |
| Watermelon | 0 | 0 | 0 |
| Limonene | 8 | 7 | 9 |
| Isopulegol | 2 | 1 | 6 |
| b-pinene | 8 | 8 | 9 |
| L-menthone | 3 | 2 | 9 |

As can be seen from these results, flavors such as cinnamon, strawberry, raspberry, lemon, winterfresh, eucalyptus, and peppermint, as well as limonene and menthone, formed an organogel with the high molecular weight (300 MW) ethyl cellulose at a level of 15% by weight. Flavors, such as mango, peach, blueberry, and jasmine tea flavor, which contain high amounts of carriers (e.g., triglycerides or NEOBEE oil) as well as b-pinene formed an organogel with both the low and high molecular weight ethyl celluloses at both concentration levels tested.

Without being bound to any particular theory, it is believed that gel formation is partially dependent on hydrogen bonding. With that said, flavors that contained terpenes such as limonene and peppermint (when combined with 15% by weight or more organogelator) formed good gels. Pure ester based flavors such as ethyl butyrate (e.g. present in some fruit flavors) formed very soft or no gels. When the flavors contained high amounts of carriers, such as neobee oil and triacetin, gelation did occur.

Example 2: Flavor Evaporation Rate

Organogel compositions prepared using various organogelators and a flavor component were evaluated to determine the flavor evaporation rate.

The organogelators used to prepare the organogels were ETHOCEL Standard 300 ethyl cellulose (ethoxyl content of 48.0%-49.5%) and ETHOCEL Medium 50 ethyl cellulose (ethoxyl content of 45.0%-47.0%), both available from Dow Chemical, AQUALON 300 ethyl cellulose (ethoxyl content of 48.0%-49.5%), available from Ashland, and candelilla wax. The organogelators were mixed with a fruit flavor component, which contained a high (30-60% by weight) amount of limonene, and the mixture was heated until the organogelator had melted. The hot mix was allowed to cool, for 24 hours at room temperature (22° C.), to form the organogel structure.

Each organogel composition was evaluated to determine the flavor evaporation rate. The cap of a vial containing the organogel composition was removed and the vial was placed on an analytical balance, the balance was zeroed at zero time, and the weight loss was measured after 1 hour. Organogel compositions and flavor evaporation rates are set forth in Table 3 below.

TABLE 3

| Sample | Flavor (g) | NEOBEE oil* (g) | Triacetin (g) | ETHOCEL Standard 300 (g) | ETHOCEL Medium-50 (g) | AQUALON 300 (g) | Candelilla (g) | Total (g) | Evap. rate (mg/hour) |
|---|---|---|---|---|---|---|---|---|---|
| Control | 10.0 | | | | | | | 10.0 | 18.10 |
| 1 | 8.0 | | | | | 1.0 | 1.0 | 10.0 | 4.30 |
| 2 | 7.5 | | | | | 1.5 | 1.0 | 10.0 | 5.00 |
| 3 | 8.0 | | | | | 1.5 | 0.5 | 10.0 | 3.40 |
| 4 | 7.5 | | | | | 1.5 | 1.0 | 10.0 | 1.80 |
| 5 | 5.0 | | 3.0 | 1.5 | | | 0.5 | 10.0 | 3.50 |
| 6 | 5.0 | 3.0 | | 1.5 | | | 0.5 | 10.0 | 6.50 |
| 7 | 8.0 | | | | | 2.0 | | 10.0 | 9.90 |
| 8 | 8.0 | | | | | | 2.0 | 10.0 | 5.40 |
| 9 | 8.0 | | | | | | 0.5 | 8.5 | 1.40 |
| 10 | 8.0 | | | | | | 0.5 | 8.5 | 1.70 |
| 11 | 8.0 | | | | | 1.5 | 0.5 | 10.0 | 3.20 |
| 12 | 8.0 | | | | 1.5 | | 0.5 | 10.0 | 2.6 |
| 13 | 8.0 | | | | 1.5 | | 0.5 | 10.0 | 2.3 |
| 14 | 8.0 | | | | 2.0 | | | 10.0 | 17.0 |
| 15 | 8.0 | | | | 1.5 | | 0.5 | 10.0 | 3.3 |
| 16 | 8.0 | | | | 1.5 | | 0.5 | 10.0 | 1.8 |
| 17 | 8.0 | | | | 1.5 | | 0.5 | 10.0 | 1.1 |
| 18 | 8.0 | | | 1.5 | | | 0.5 | 10.0 | 13.9 |
| 19 | 8.0 | | | 1.5 | | | 0.5 | 10.0 | 14.1 |
| 20 | 8.0 | | | 1.5 | | | 0.5 | 10.0 | 12.7 |
| 21 | 8.0 | | | | 0.421 | | 0.5 | 8.9 | 2.6 |
| 22 | 8.0 | | | | 0.888 | | 0.5 | 9.4 | 1.4 |
| 23 | 8.0 | | | | 1.412 | | 0.5 | 9.9 | 2.1 |
| 24 | 8.0 | | | | 2.000 | | 0.5 | 10.5 | 3.6 |
| 25 | 8.0 | | | | 2.666 | | 0.5 | 11.2 | 3.2 |

*Neobee M-5 (Ungerer & Co)

The control (neat flavor, no organogel) had an evaporation rate of 18.10 mg/hour. Inclusion of the flavor in an organogel formed using AQUALON 300 ethyl cellulose at the level of 20% by weight as the sole organogelator reduced the flavor evaporation rate to 9.9 mg/hour (see Sample 7), but when an organogel was formed using the same amount of ETHOCEL Medium 50 as the sole organogelator, the same level of evaporation reduction was not observed (see Sample 14, which had an evaporation rate of 17.0 mg/hour).

Organogels formed using candelilla wax as the sole organogelator also demonstrated a reduced evaporation rate as compared to the control. Organogels comprising candelilla wax at a level of 20% by weight had an evaporation rate of only 5.40 mg/hour (see Sample 8), while organogels comprising candelilla wax at a level of around 5-6% by weight had an evaporation rate of 1.40 and 1.70 mg/hour (see Samples 9 and 10).

Organogels formed using certain combinations of ethyl cellulose and candelilla wax as organogelators also demonstrated a reduced evaporation rate as compared to the control. For example, organogels comprising 15% by weight of AQUALON 300 ethyl cellulose and 10% by weight candelilla wax had an evaporation rate of as low as 1.80 mg/hour (see Sample 4), while organogels comprising 15% by weight of ETHOCEL Medium 50 and 5% by weight candelilla wax had an evaporation rate of as low as 1.1 mg/hour (see Sample 17).

Example 3: Oil Binding Capacity

Many flavor components comprise flavor oils or oil carriers. The ability of an organogel prepared using various organogelators and a flavor component to form a strong gel that binds flavors and maintains its strength was evaluated by determining the oil binding capacity of the organogels.

The organogel compositions were prepared as described in Example 1. The organogel composition components are set forth in Table 4 below.

TABLE 4

| Component (g) | 1 | 2 | 3 | 4 | 5 | 6 | 7 | 8 | 9 | 10 | 11 | 12 |
|---|---|---|---|---|---|---|---|---|---|---|---|---|
| Fruit Flavor | 60 | 56.25 | 60 | 56.25 | 60 | 60 | 60 | 60 | 60 | 60 | 60 | 60 |
| ETHOCEL Medium 50 | 11.25 | 11.25 | — | — | — | — | — | — | 11.25 | — | 15 | — |
| ETHOCEL Standard 300 | — | — | 11.25 | 11.25 | 11.25 | — | — | 11.25 | — | 15 | — | 11.25 |
| Candelilla wax | 3.75 | 7.5 | 3.75 | 7.5 | — | 15 | — | — | — | — | — | — |
| Rice bran wax | — | — | — | — | — | — | 15 | 3.75 | 3.75 | — | — | — |
| Glycerol monostearate | — | — | — | — | 3.75 | — | — | — | — | — | — | 3.75 |
| Total | 75 | 75 | 75 | 75 | 75 | 75 | 75 | 75 | 75 | 75 | 75 | 75 |

*All amounts are in grams

The oil binding capacity of the organogel compositions was determined as the ability of the organogel composition to retain oil following centrifugation at 11,000 rpm for 30 minutes. The results are set forth in FIG. 1. As can be seen from FIG. 1, there was no visible oil following centrifugation for Samples 1 and 2 (formed from flavor, candelilla wax and ETHOCEL Medium 50), indicating that Samples 1 and 2 bound 100% of the flavor. Sample 6 (formed from flavor and candelilla wax; 98.15% oil binding capacity), Sample 7 (formed from flavor and rice bran wax; 92.52% oil binding capacity) and Sample 9 (formed from flavor, ETHOCEL Medium 50, and rice bran wax) also bound the flavor and kept their strength. Samples 3, 4, 5, 8, 10, 11, and 12 were weaker gels that lost strength following centrifugation.

These results suggest that strong gels can be formed using the combination of ETHOCEL Medium 50 and an edible wax as organogelators, while relatively stable gels can also formed using edible waxes, such as candelilla wax, as the sole organogelator.

Example 4: Organogel Strength

The strength of organogel compositions prepared using ETHOCEL Standard 300 or ETHOCEL Medium 50 as the organogelator was determined by evaluating the ability of the organogel composition to maintain its shape.

The organogel compositions were prepared as described in Example 1. The organogel composition components are set forth in Table 5 below.

TABLE 5

| | A | B | C | D | E | F | G | H | I | J | K | L |
|---|---|---|---|---|---|---|---|---|---|---|---|---|
| Fruit Flavor | 16 | 15 | 16 | 16 | 15 | 16 | 16 | 17 | 18 | 9.5 | 16 | 16 |
| ETHOCEL Medium 50 | 3 | 3 | 2 | | | | | | | | | 2 |
| ETHOCEL Standard 300 | | | | 3 | 3 | 2 | | | | | 2 | |
| Candelilla wax | | | | | | | | | | | 1 | 1 |
| Hydrogenated triglyceride (Palsgaard 6115) | 1 | 2 | 2 | 1 | 2 | 2 | 4 | 3 | 2 | 1 | 1 | 1 |
| Total | 20 | 20 | 20 | 20 | 20 | 20 | 20 | 20 | 20 | 20 | 20 | 20 |

24 hours after formation of the organogel compositions, vials containing the organogel composition samples were rotated 90 degrees, and visually evaluated after 24 hours to determine if the organogel changed position in the vial. The results are set forth in FIGS. 2 and 3.

Figure 2:
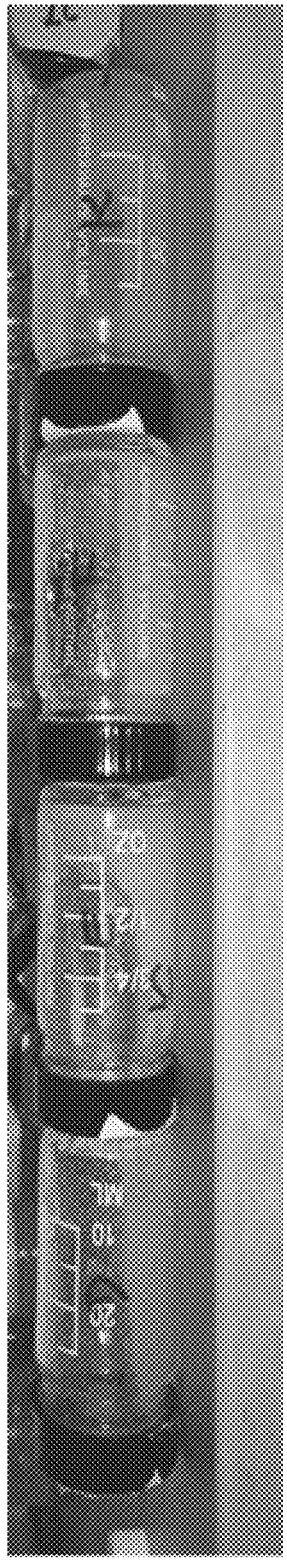
FIG. 2 is a picture depicting the strength of organogel compositions prepared using ETHOCEL Standard 300 as the organogelator.
Figure 3:
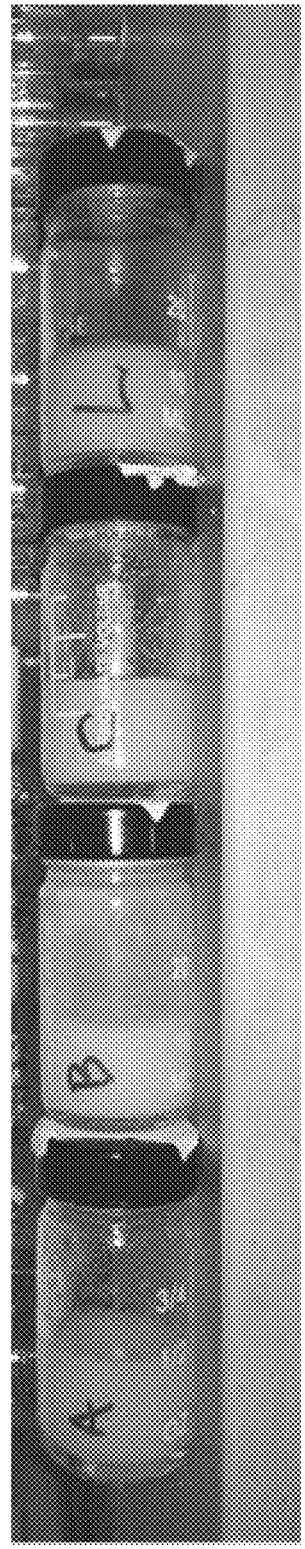
FIG. 3 is a picture depicting the strength of organogel compositions prepared using ETHOCEL Medium 50 as the organogelator.
Figure 4C:
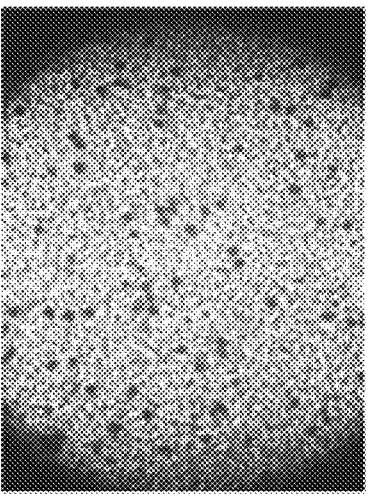
FIGS. 4A-4E are microscopic images of an organogel composition, formed using ETHOCEL Standard 300 and candelilla wax as the organogelators, at various magnifications.
Figure 4B:
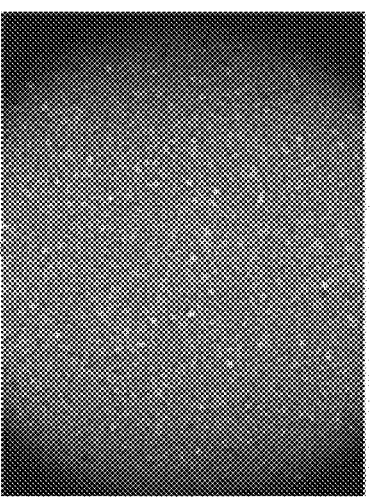
Figure 4E:
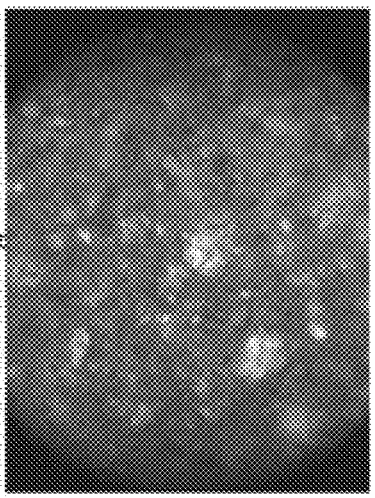
Figure 4A:
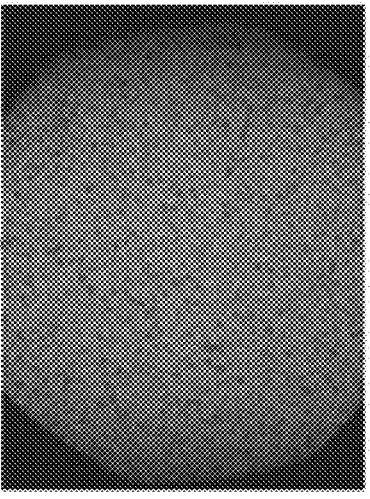
Figure 4D:
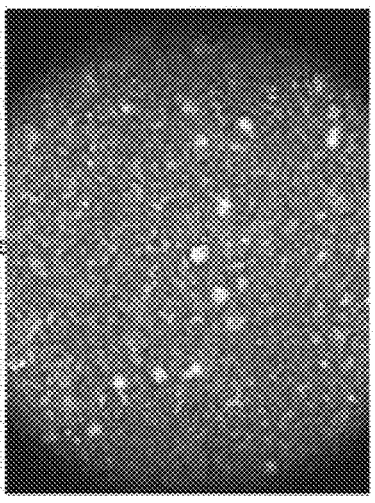
Figure 5C:
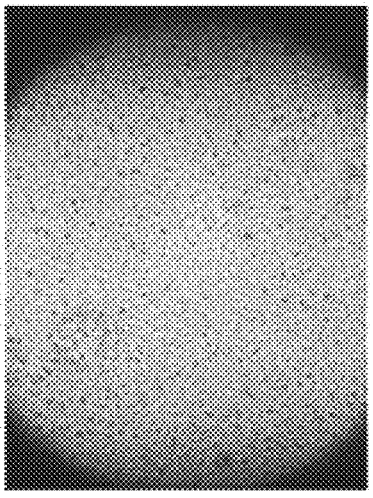
FIGS. 5A-5E are microscopic images of an organogel composition, formed using ETHOCEL Medium 50 and candelilla wax as the organogelators, at various magnifications.
Figure 5B:
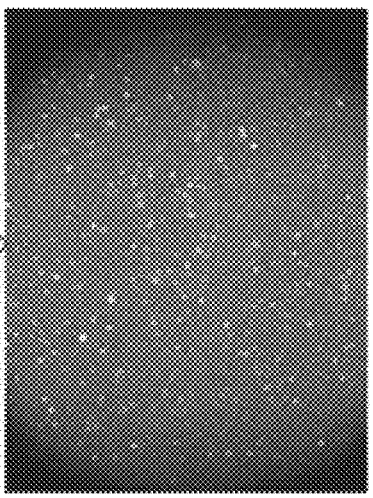
Figure 5E:
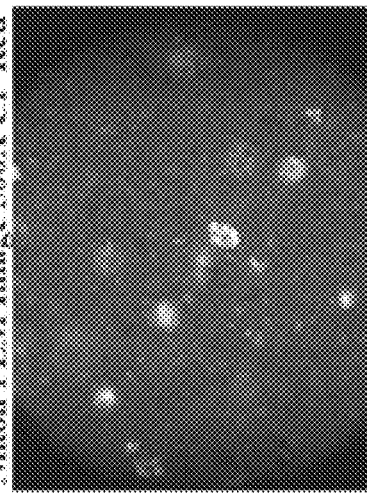
Figure 5A:
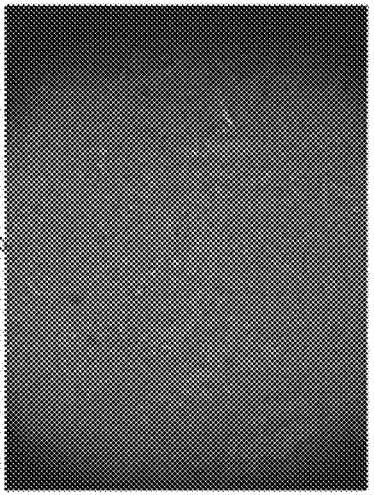
Figure 5D:
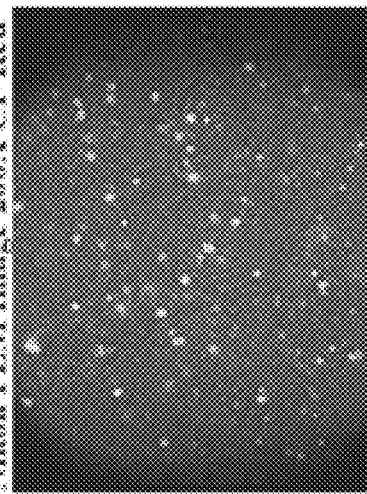
Figure 6C:
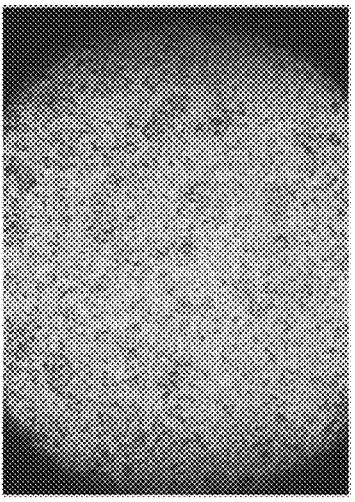
FIGS. 6A-6E are microscopic images of an organogel composition, formed using candelilla wax as the organogelator, at various magnifications.
Figure 6B:
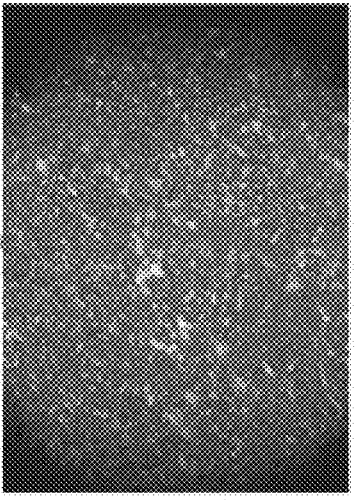
Figure 6E:
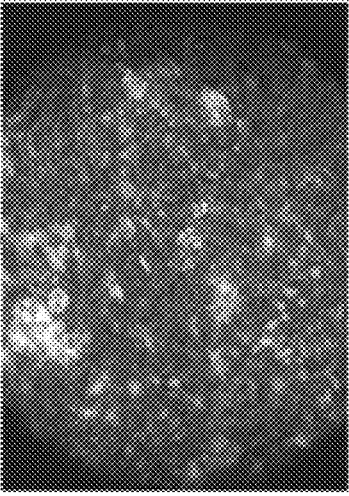
Figure 6A:
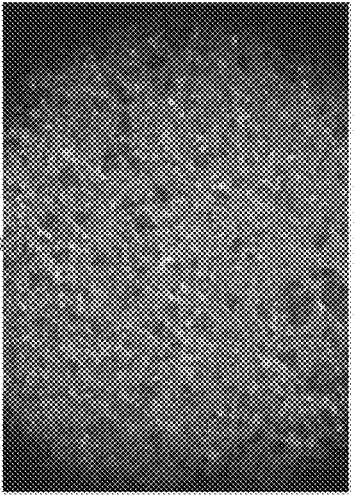
Figure 6D:
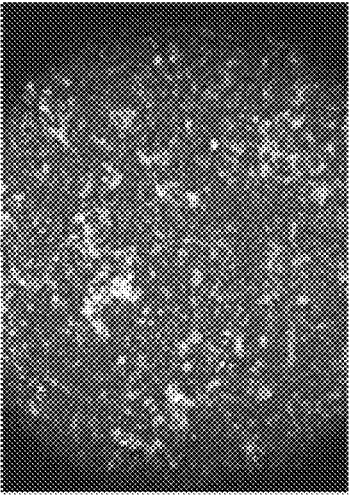

As can be seen from FIG. 2, the organogels formed using ETHOCEL Standard 300 as the organogelator were not strong, and changed their shape according to the position of the container. In contrast, as can be seen from FIG. 3, organogels formed using ETHOCEL Medium 50 as the organogelator were stronger, and kept their shape even when the container changed position from vertical to horizontal. Control compositions G-J (not shown), which contained no organogelator, did not form a gel.

Example 5: Organogel Structure

Organogel compositions comprising different organogelators were evaluated microscopically (Nikon PLM microscope) at varying magnifications. The results are set forth in FIGS. 4-6.

FIGS. 4A-4E depict microscope images of organogels formed using ETHOCEL Standard 300 and candelilla wax as the organogelators (15% by weight ETHOCEL Standard 300, 5% by weight candelilla wax, and 80% by weight flavor), and FIGS. 5A-5E depict microscope images of organogels formed using ETHOCEL Medium 50 and candelilla wax as the organogelators (15% by weight ETHOCEL Medium 50, 5% by weight candelilla wax, and 80% by weight flavor). As can be seen from these figures, the ETHOCEL Medium 50 and candelilla wax formed an organogel having a closer net, and smaller crystals, than gels formed using ETHOCEL Standard 300 and candelilla wax. Without wishing to be bound to any particular theory, this may be the result of higher hydrogen bonding achieved when using the ETHOCEL Medium 50, which results in the strands of the ethyl cellulose being closer together, a lower evaporation rate, and stronger gel. FIGS. 6A-6E depict microscopic images of organogels formed from mint oil and candelilla wax (80% by weight mint oil and 20% by weight candelilla wax). As can be seen from FIGS. 6A-6E, this organogel was not as tight and had larger crystals, as compared to the gel formed from ETHOCEL Medium 50 and candelilla wax.

Example 6: Encapsulated Organogel Composition

An organogel composition was prepared and encapsulated by spray-drying. An organogel composition comprising 15% by weight of candelilla wax and 85% by weight of flavor was prepared by adding the candelilla wax (Ungerer & Co., Lincoln Park, N.J.) to a fresh mint flavor, followed by mixing. The mixture was heated to 65-70° C. to melt the wax, and the hot mix was allowed to cool.

The resulting organogel composition was encapsulated by adding the organogel composition to a 40% solution of acacia gum (acacia Senegal), and the resulting solution was mixed at high speed using a propeller mixer until a whitish emulsion was formed. The emulsion was homogenized using a high pressure homogenizer, and pumped to the top of the atomizer wheel of a spray drier, and spray dried (dryer inlet temperature 190-200° C.; outlet temperature 90-105° C.). The sample was collected and allowed to cool.

Example 7: Shelf-Life

The shelf-life of gums comprising a flavor-containing organogel composition was compared to a commercially available chewing gum by evaluating the flavor intensity over eight weeks.

Figure 7A:
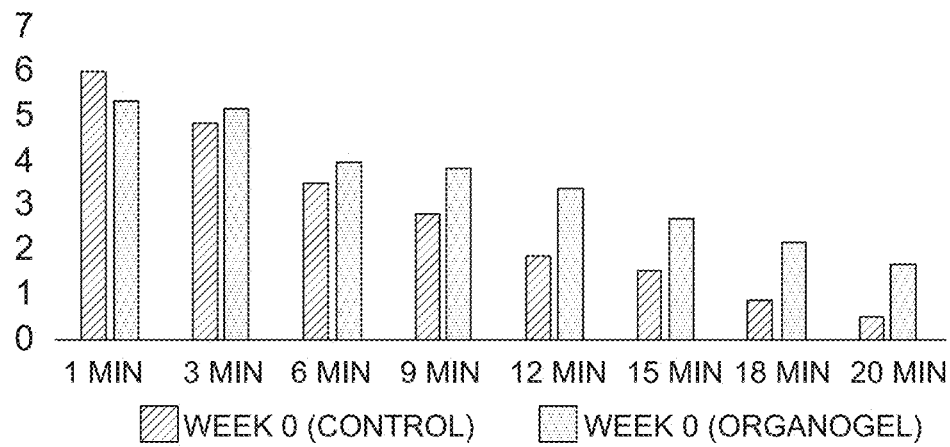
FIGS. 7A, 7B, and 7C are graphs comparing the flavor intensity of a chewing gum comprising an organogel composition as the flavor component to the flavor intensity of a control chewing gum comprising neat flavor after storage for 1 week (FIG. 7A), 4 weeks (FIG. 7B), or 8 weeks (FIG. 7C). Flavor intensity was evaluated over a 20 minute chew.
Figure 7B:
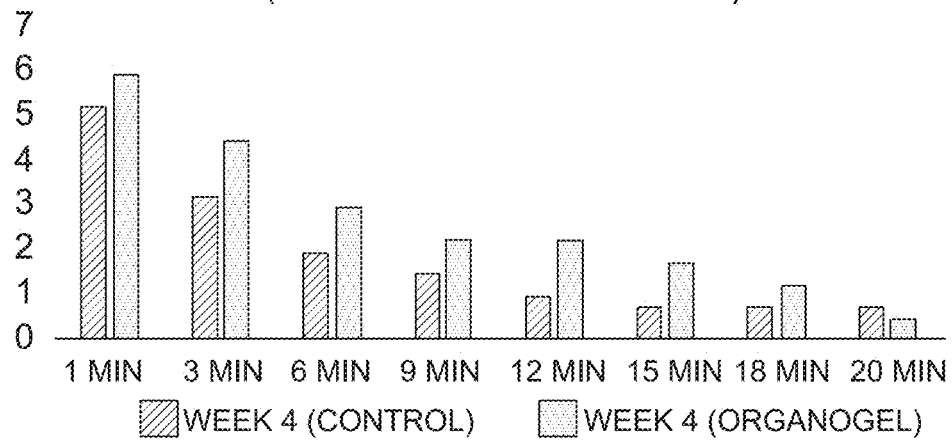
Figure 7C:
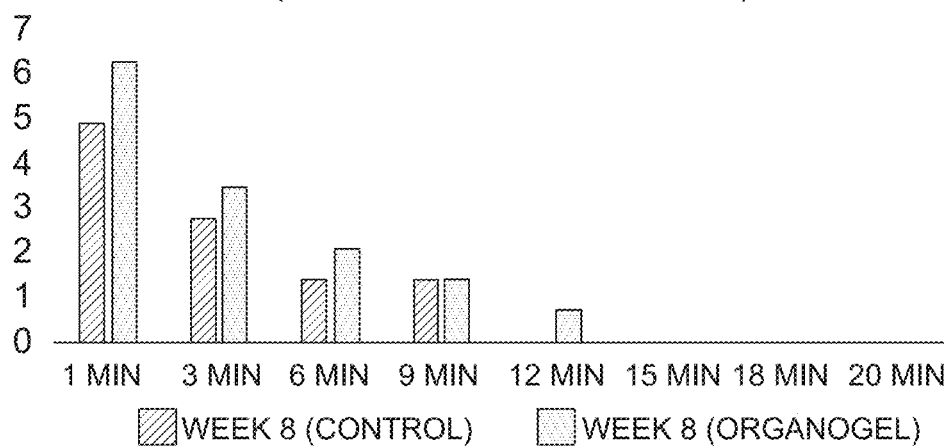

An organogel composition comprising ethyl cellulose (ETHOCEL Standard 300) and fruit flavor was prepared as described in Example 1 (containing 15% by weight ETHOCEL Standard 300, 5% by weight glycerol monostearate, and 80% by weight fruit flavor) and incorporated into a chewing gum as the flavor component at 1.5% by weight of the chewing gum composition. The resulting gum samples (n=6) were stored in a HBO bag at 30° C. for 8 weeks. The gum was chewed for 20 minutes, and flavor intensity was evaluated each week on a scale of 0-10 and averaged and compared to the flavor intensity of a commercially available control gum (JUICY FRUIT gum) that did not contain organogel. The results are set forth in FIGS. 7A-7C.

As can be seen from these results, the gum comprising the organogel had a generally stronger flavor intensity over the duration of the chew after 1, 4, and 8 weeks of storage. These results suggest that organogel compositions can be used to improve the flavor duration in chewing gums, as compared to gums having neat flavor.

Example 8: Flavor Release

In this example, gums comprising flavor-containing organogels were evaluated for flavor release.

Organogel compositions comprising a fruit flavor and from 0-20% by weigh candelilla wax were prepared as described in Example 1. The organogel compositions had the following composition:

Sample 1: Control (flavor only, 0% candelilla wax)
Sample 2: 10% candelilla wax; 90% flavor
Sample 3: 15% candelilla wax; 85% flavor
Sample 4: 20% candelilla wax; 80% flavor
Sample 5: 25% candelilla wax; 75% flavor The samples were incorporated into a chewing gum as the flavor component. The chewing gum formulations are set forth in Table 6.

TABLE 6

Gum formula

| Ingredient (grams) | A | B | C | D | E |
|---|---|---|---|---|---|
| Sugar | 544.7 | 543.2 | 542.45 | 541.7 | 540.95 |
| Gum base | 219.27 | 219.27 | 219.27 | 219.27 | 219.27 |
| Corn Syrup | 100 | 100 | 100 | 100 | 100 |
| Dextrose Monohydrate | 99.5 | 99.5 | 99.5 | 99.5 | 99.5 |
| Flavor (neat) (Sample 1) | 15 | — | — | — | — |
| Flavor (Sample 2) | — | 16.5 | — | — | — |
| Flavor (Sample 3) | — | — | 17.25 | — | — |
| Flavor (Sample 4) | — | — | — | 18 | — |
| Flavor (Sample 5) | — | — | — | — | 18.75 |
| Glycerin | 8 | 8 | 8 | 8 | 8 |
| Flavor (neat) | 6.25 | 6.25 | 6.25 | 6.25 | 6.25 |
| High potency sweetener | 6.28 | 6.28 | 6.28 | 6.28 | 6.28 |
| Lecithin | 1 | 1 | 1 | 1 | 1 |
| Total (grams) | 1000 | 1000 | 1000 | 1000 | 1000 |

The gums were chewed for 10 minutes following storage for 3 months at 22° C. (room temperature). Samples of the gums prior to chew and of gum cuds after a 10 minute chew were analyzed for flavor content. The results are set forth in Table 7.

TABLE 7

| Sample (Chew Time, min) | Ethyl Butyrate % | Isoamyl acetate % | Limonene % | Cinnamic aldehyde % | Methyl salicylate % | Isobutyl acetate % | Eugenol % | Total Flavor % | % Flavor release |
|---|---|---|---|---|---|---|---|---|---|
| 1 (10) | 0.029 | 0.07 | 0.195 | 0.009 | 0.022 | 0.012 | 0.061 | 0.398 | 22.72 |
| 1 (0) | 0.066 | 0.109 | 0.225 | 0.012 | 0.024 | 0.017 | 0.062 | 0.515 | |
| 2 (10) | 0.023 | 0.054 | 0.154 | 0.008 | 0.018 | 0.012 | 0.053 | 0.322 | 15.48 |
| 2 (0) | 0.042 | 0.074 | 0.164 | 0.01 | 0.019 | 0.015 | 0.057 | 0.381 | |
| 3 (10) | 0.018 | 0.047 | 0.145 | 0.007 | 0.015 | 0.015 | 0.048 | 0.295 | 36.00 |
| 3 (0) | 0.054 | 0.091 | 0.203 | 0.012 | 0.025 | 0.015 | 0.061 | 0.461 | |
| 4 (10) | 0.023 | 0.052 | 0.146 | 0.008 | 0.018 | 0.012 | 0.052 | 0.311 | 31.19 |
| 4 (0) | 0.058 | 0.091 | 0.191 | 0.012 | 0.022 | 0.017 | 0.061 | 0.452 | |
| 5 (10) | 0.017 | 0.043 | 0.129 | 0.007 | 0.016 | 0.012 | 0.049 | 0.273 | 22.88 |
| 5 (0) | 0.035 | 0.064 | 0.15 | 0.012 | 0.02 | 0.015 | 0.058 | 0.354 | |

Table 7 shows the percentage of individual chemicals and the total percent of flavor components remaining in the gum prior to chew (time 0) and after a 10 minute chew. As can be seen from these results, Sample 3 (15% candelilla wax) released the most flavor (36%), and more than control Sample 1 (~23%).

Example 9: Flavor Duration in Gum

The ability of organogel compositions to increase the duration of flavor release in gums was evaluated.

Chewing gums containing flavor in either an organogel (20% by weight ETHOCEL Standard 300, 4% by weight polysorbate 80 and sorbitan 80, and 76% by weight mint flavor) or neat (control) were evaluated for flavor release after 20 minutes of chewing. The chewing gum formulations are set forth below in Table 8.

TABLE 8

| Gum Base (g) | 622.0 | 615.2 |
|---|---|---|
| Sorbitol (g) | 328 | 328 |
| Peppermint (Control) (g) | 19.5 | |
| Organogel (g) | | 26.3 |
| Sweeteners (g) | 25 | 25 |

TABLE 8-continued

| Lecithin (g) | 1 | 1 |
|---|---|---|
| Other (color, etc.) | 4.5 | 4.5 |
| Total (g) | 1000.0 | 1000.0 |

The gums were chewed by 5 Wrigley internal panelists for 20 minutes under metronome at 60 bites per minute, and rated for flavor release. Each formulation was evaluated three times. Samples with the flavor in the organogel were rated significant higher (i.e., as having a higher amount of flavor released) as compared to the control samples. One-way analysis, means comparison, and comparisons using "Student's t" demonstrated that the amount of menthol, menthone and limonene released from the sample containing flavor in the organogel was significantly different (higher) than the amount of menthol, menthone and limonene amount released from control sample (containing liquid flavor).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of preparing an edible organogel composition, the method comprising:
   combining an ethyl cellulose, wherein the ethyl cellulose has an average ethoxyl content of from about 45.0% to about 47.0% by weight of the ethyl cellulose, a flavor component, and an edible wax to form a mixture, wherein the edible organogel composition comprises the ethyl cellulose and the edible wax in a weight ratio of greater than 1:1;
   heating the mixture at a temperature above a glass transition temperature of the ethyl cellulose; and
   cooling the mixture to a temperature below a gel point of the mixture.

2. The method of claim 1, wherein the mixture is heated to a temperature of from about 60° C. to about 300° C.

3. The method of claim 1, wherein the mixture is heated for about 1 minute to about 120 minutes.

4. The method of claim 1, wherein the mixture is heated until the mixture has melted.

5. The method of claim 1, wherein the mixture is cooled to a temperature of less than 30° C.

6. The method of claim 1, further comprising treating the organogel composition by an encapsulation process.

7. The method of claim 6, wherein the organogel composition is encapsulated by a spray drying process.

8. The method of claim 7, further comprising coating materials, wherein the coating materials comprise acacia gum, starches, maltodextrins, corn syrup solids, alginates, agar, gelatin, methyl cellulose, cyclodextrin, other carriers, or combinations thereof.

9. The method of claim 7, further comprising a mixture, wherein the mixture comprises, by weight, about 0% to about 60% of water, about 32% to about 10% of ingredients used to encapsulate the organogel composition, and about 5% to about 12% of the organogel composition prior to being spray dried.

10. The method of claim 7, wherein inlet temperature for the spray drying process is from about 180° C. to about 205° C., and wherein outlet temperature for the spray drying process is from about 80° C. to about 105° C.

11. The method of claim 1, further comprising incorporating the organogel composition into a confectionery product.

12. The method of claim 11, wherein the organogel composition is incorporated into the confectionery product by an admixing step.

13. The method of claim 12, wherein the admixing step can include a process selected from: adding the organogel composition to the confectionery product, spraying the organogel composition on the confectionery product, coating the organogel composition on the confectionery product, suspending the organogel composition in the confectionery product, painting the organogel composition on the confectionery product, pasting the organogel composition on the confectionery product, mixing the organogel composition with the confectionery product, or any combination thereof.

14. The method of claim 1, further comprising coating the organogel composition on a confectionery product.

15. The method of claim 14, wherein the confectionery product is coated by enrobing, spraying, dipping, brushing, tumbling, or a combination thereof.

16. The method of claim 1, wherein the flavor component comprises a flavor and a carrier.

* * * * *